Jan. 24, 1961 K. G. NYSTRÖM 2,969,255
PROTECTIVE CABIN FOR TRACTORS
Filed Jan. 11, 1957 5 Sheets-Sheet 1

INVENTOR
KARL GÖSTA NYSTRÖM
BY
ATTORNEY

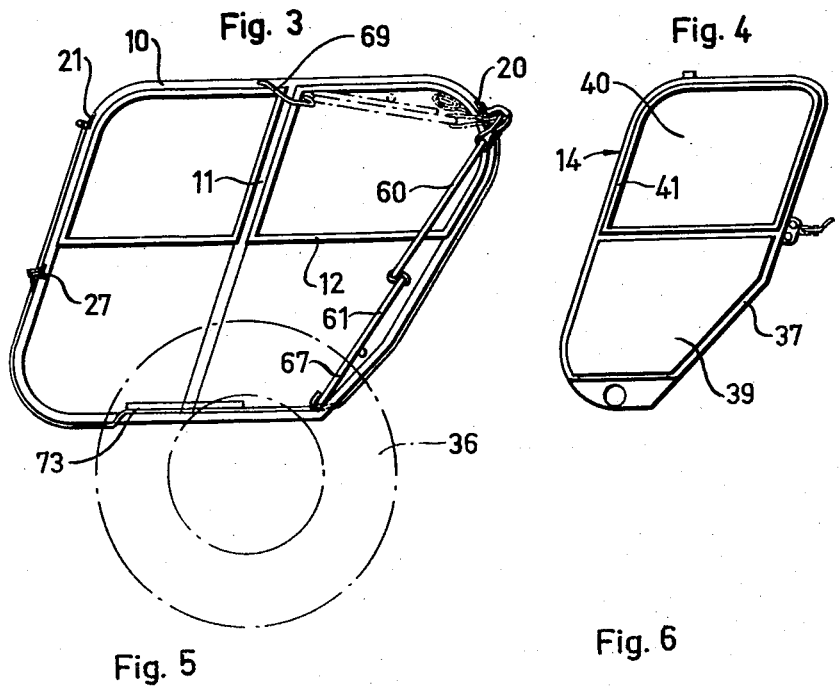
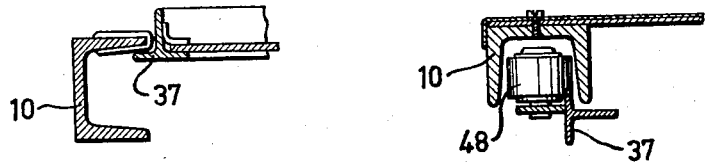
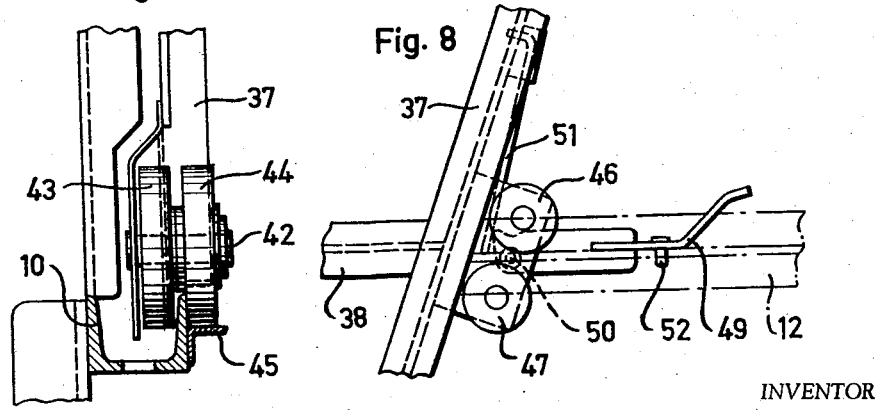

Jan. 24, 1961 K. G. NYSTRÖM 2,969,255
PROTECTIVE CABIN FOR TRACTORS
Filed Jan. 11, 1957 5 Sheets-Sheet 3
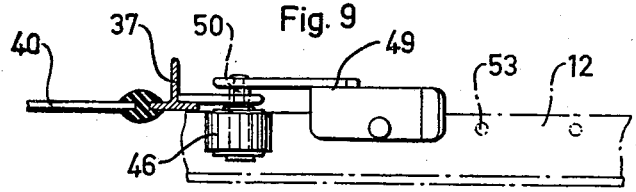
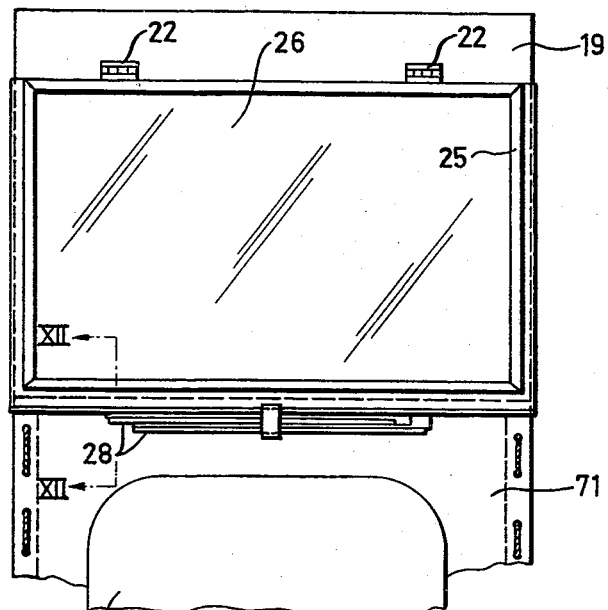
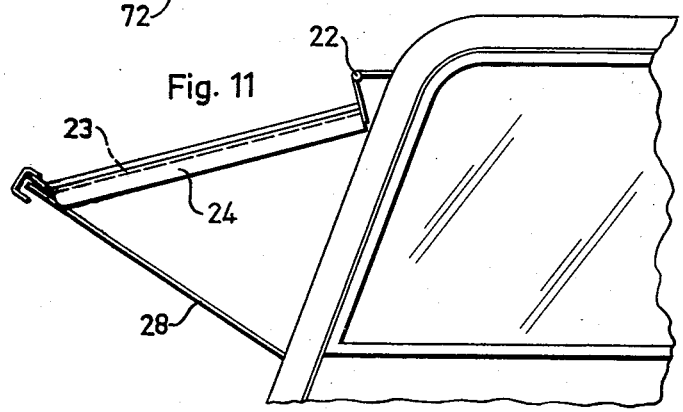
INVENTOR
KARL GÖSTA NYSTRÖM
BY
ATTORNEY Jan. 24, 1961   K. G. NYSTRÖM   2,969,255
PROTECTIVE CABIN FOR TRACTORS
Filed Jan. 11, 1957   5 Sheets-Sheet 4
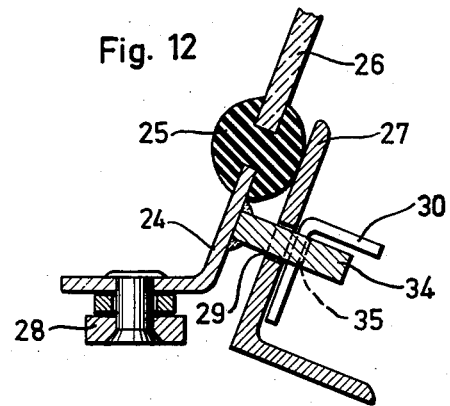
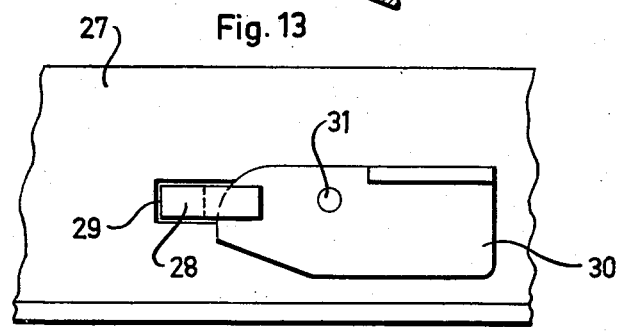
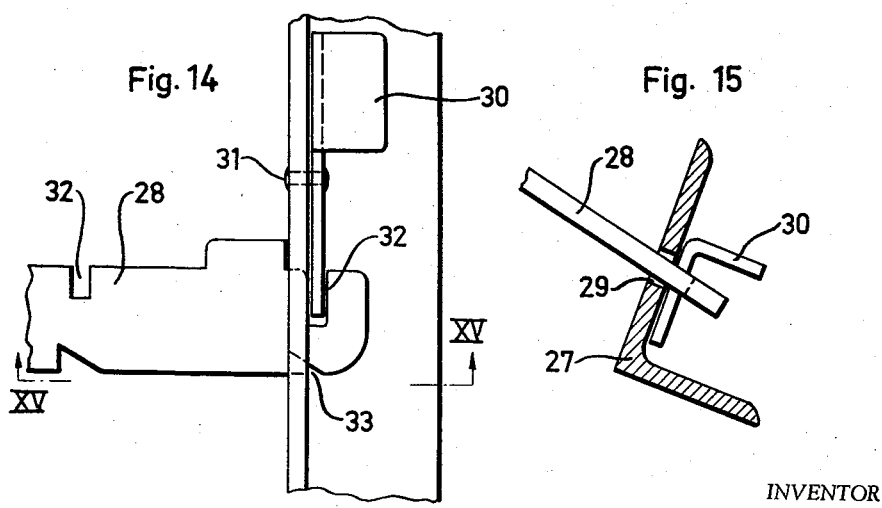
INVENTOR
KARL GÖSTA NYSTRÖM
BY
ATTORNEY Jan. 24, 1961 K. G. NYSTRÖM 2,969,255
PROTECTIVE CABIN FOR TRACTORS
Filed Jan. 11, 1957 5 Sheets-Sheet 5
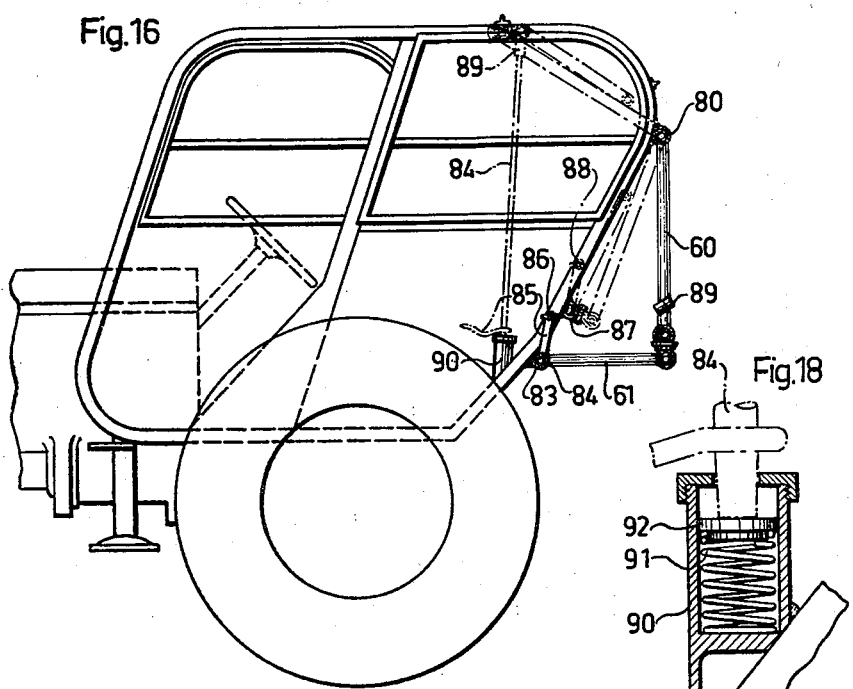
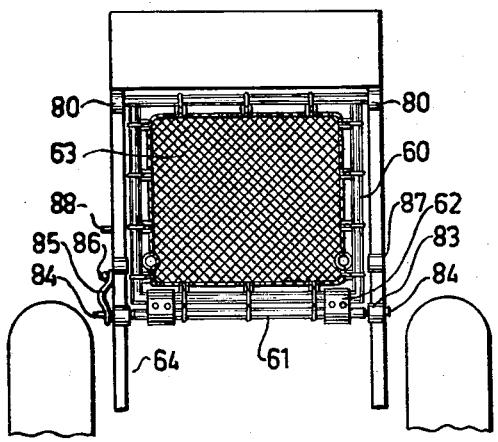
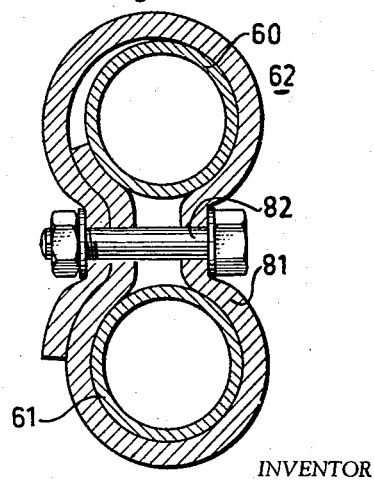
INVENTOR
KARL GÖSTA NYSTRÖM
BY
ATTORNEY

United States Patent Office 2,969,255
Patented Jan. 24, 1961

2,969,255

PROTECTIVE CABIN FOR TRACTORS

Karl Gösta Nyström, Bolea, Teg, Sweden, assignor to Aktiebolaget Nordpatent, Stockholm, Sweden, a limited company of Sweden Filed Jan. 11, 1957, Ser. No. 633,707

Claims priority, application Sweden Jan. 18, 1956

6 Claims. (Cl. 296—102)

The present invention generally relates to tractor cabins and more particularly to cabins of the kind adapted to protect the operator against injury in the case of rearing or overturning of the tractor.

The invention has for its object to provide a novel protective cabin for tractors which is improved in various respects as compared to previously known constructions.

According to an important feature of the invention a tractor protective cabin of the kind referred to and having a front door opening on one, at least, of its two sides, is so shaped as to have both its front and its back inclined rearwardly and upwardly. This design makes it possible to extend the cabin sufficiently forwardly on either sides of the engine compartment to enable a substantial part of the bottom portion of the door opening to be disposed in front of the corresponding rear wheel, whereby the cabin can be conveniently entered or left by the operator on that side of the tractor, and to retract the rear edges of the cabin sides sufficiently forwardly not to obstruct the freedom of angular movement relative to the tractor of any implements connected to the tractor. Further, owing to the rearwardly inclined shape of the cabin, the cabin is adapted to afford effective protection against turning upside down in case of rearing of the tractor, in that in this event the rearwardly projecting roof edge will engage the ground before the tractor will have reared sufficiently to turn over.

In a preferred embodiment of the invention, in a tractor protective cabin constructed in the manner described the door opening as a whole is designed to be inclined in such a way that its top portion is rearwardly offset relative to its bottom portion, the door opening being arranged to be closed by a correspondingly shaped sliding door which, in its open position, is disposed completely, thus also at its rear edge, inside the side wall of the tractor and is protected thereby. It is preferable to design both the door opening and the door to be substantially parallelogram-shaped. Further, the sliding door should, to advantage, be sufficiently sturdy in construction to be able in its closed position to offer an effective safeguard to the operator in the event of a turnover of the tractor.

A further important feature of novelty in conjunction with the tractor protective cabin according to the invention resides in that the cabin is provided with a seat for one or more passengers which seat is disposed behind the operator's seat and is suspended from the rearwardly projecting roof-portion of the cabin and is designed to be foldable in such a manner as to be movable to a storage position when not in use. The foldable rear seat should preferably be sufficiently sturdy of construction to effectively protect the passengers and to prevent objects such as logs of timber loaded on a load-trailer from penetrating into the tractor cabin from behind and injuring the passengers.

Further novel and advantageous features of the tractor protective cabin according to the invention will appear from the following description of a preferred embodiment thereof in conjunction with the accompanying drawings, in which:

Fig. 3 is a longitudinal section through the cabin taken along the line III—III in Fig. 2.

Fig. 4 is a side elevation of the sliding door of the cabin.

Figure 1:
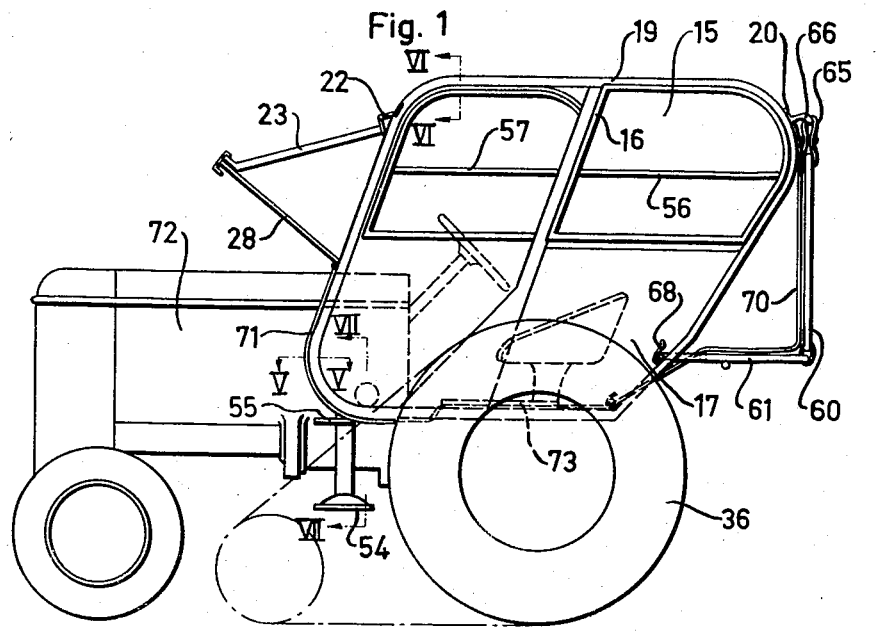
Fig. 1 is a side elevation of a tractor having mounted thereon a protective cabin with a passenger seat in its fold-out position of use.

Figs. 5, 6 and 7, on a larger scale, show fragmentary sections taken along the lines V—V, VI—VI and VII—VII, respectively, in Fig. 1.

Figs. 8 and 9, on a larger scale, show a fragmentary side view and plan view, respectively, of a guiding and locking device for the sliding door.

Fig. 10 is a fragmentary front view and Fig. 11 a corresponding side view of the tractor cabin.

Fig. 12, on a larger scale, shows a fragmentary cross section taken along the line XII—XII in Fig. 10.

Figs. 13 and 14 illustrate the details of Fig. 12 as seen from inside and from above, respectively.

Fig. 15 is a fragmentary section taken along the line XV—XV in Fig. 14.

Figure 2:
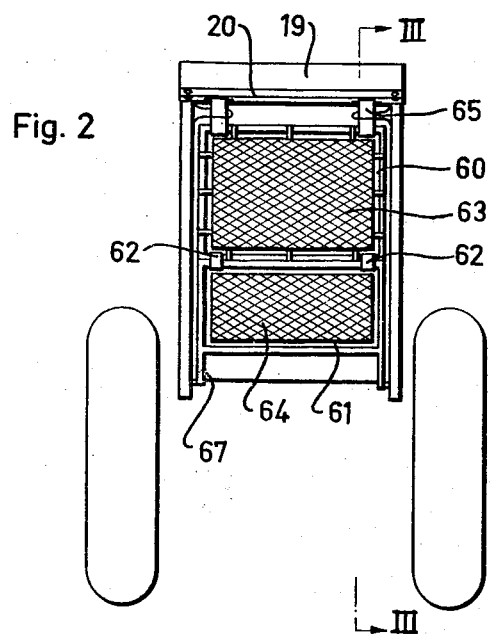
Fig. 2 is a rear view of the tractor and cabin with the passenger seat in its position of being extended and swung aside from non-use.

Figs. 16 and 17 are views corresponding to Figs. 1 and 2 but showing a passenger seat of a modified construction.

Figs. 18 and 19 show constructional details.

The tractor cabin illustrated in the drawings is built up on a powerful sectional steel body frame which is detachably bolted to the undercarriage frame of the tractor. The body frame is composed of two all-welded side-sections and a plurality of cross-members interconnecting these side-sections. Each side-section consists of a frame 10 made of a powerful channel member which is bent to shape in a plane parallel to the flanges and in such a manner that the flanges are directed inwardly towards the center of the frame, the meeting ends of the members being welded together. The two upper corners and the front bottom corner of the frame are smoothly rounded. Welded in between the top and bottom frame sections— which are parallel with each other and with the supporting surface of the tractor—is a T-member 11 extending in spaced parallel relation to the downwardly and forwardly inclined front section of the frame. Another T-member 12 is welded in between the upstanding T-member 11 and the rear section of the frame 10 and extends in spaced parallel relation to the top and bottom sections of the frame. The opening defined between the upstanding T-member 11 and the front portion of the frame 10, and being situated in part in front of a vertical tangential plane drawn to the leading side of the circumference of the rear wheels, is closable by means of a sliding door 14 to be described further below. Inserted into the frame opening situated above the T-member 12 by means of a rubber channel 16 is a window pane 15 while the opening defined beneath said T-member is covered by a body plate 17 formed at its front bottom corner with a triangular portion which projects forwardly past the upstanding T-member 11 and constitutes the rear boundary of the lower portion of the door opening.

A roof 19 consisting of a masonite panel and a sheet-metal plate superposed thereon, is mounted on the body frame between a rear cross-member 20 and a front cross-member 21 thereof. Hinged to the front cross-member 21, at 22, is a front window 23 consisting of a steel sectional frame 24 and a pane 26 inserted therein by means of a rubber molding 25. The two lateral members of the window frame consist of angle members having their flanges directed inwards and rearwards, whereby, when the window is in its closed position, the two rearwardly directed flanges of the window frame embrace the frontmost portions of the side sections 10 of the body frame resulting in increased sturdiness.

The window opening is bounded at its bottom edge by a front bottom cross-member 27. This cross-member 27 and the front surfaces of the lateral body frame sections 10 are sealingly engaged by the window through the intermediary of the rubber molding 25. To retain the window in its open position, two window stays 28 are pivotally connected to the window frame 24 and are passed through corresponding rectangular holes 29 in the cross-member 27. To enable the window to be locked in a desired angular position, a locking plate 30 is mounted on, and angularly movable about, a pivot pin 31 so as to be moved into locking engagement with one of a plurality of locking recesses 32 made in the adjacent edge of the window stay, simultaneously urging the window stay so as to cause a corresponding one of a plurality of locking recesses 33 made in the opposite edge of the window stay to be engaged by the edge of the hole 29. To enable the window to be locked in its completely closed position, there are welded to the inwardly facing surface of the bottom portion of the window frame 24 two locking tongues 34 which are adapted—after the window stays have been pulled out and folded into their inoperative positions, as shown in Fig. 10—to be passed through corresponding ones of the holes 29 after which they are locked in place by moving the locking plate 30 into engagement with a locking recess 35 formed in the tongue.

As will be most clearly apparent from Fig. 1, the lateral body frame sections 10 are dimensioned and disposed in such a manner as to cause the top rear cross-member 20 to be spaced by a substantial amount to the rear of a vertical plane of tangency drawn to the trailing side of the circumference of the rear wheels 36 of the tractor. This has the favorable result that, in the case of rearing of the tractor, the cross-member 20 and the uppermost portions of the lateral frame sections 10 will engage the ground and thus effectively prevent the tractor from turning upside down. At the same time the lateral frame sections 10 are extended sufficiently forwardly at their bottom ends not to cause the side-walls of the protective cabin to obstruct the freedom of angular mobility relative to the tractor of an implement connected thereto. Further, as will be seen from Fig. 1, the front portions of the lateral frame sections are extended sufficiently forwardly on either sides of the engine compartment to enable the door opening to be disposed far enough forward to allow the operator, irrespective of the rear wheel, to enter and leave the cabin on that side of the tractor.

The above-mentioned sliding door 14 consists of a frame formed by bending a T-member 37 into the configuration illustrated in Fig. 4. A horizontally extending T-member 38 welded into the frame divides the door into a lower section which is covered by a sheet-metal plate member 39, and an upper portion having a window pane 40 inserted therein by means of a rubber molding 41. The door frame 37 is engageable with its outwardly projecting flanges into the space formed between the edge flanges of the corresponding body frame section 10 of the cabin, as illustrated in Figs. 5, 6 and 7, so as to prevent the door 14 from being pressed into the cabin in the event of a turnover of the vehicle. Mounted on a horizontal journal pin 42 at the front bottom portion of the door are two rollers 43 and 44 (see Fig. 7) of which the innermost one 44 bears on a track formed by an angle member 45 welded to the inwardly facing surface of the lateral body frame section 10, while the outermost roller 43 engages between the flanges of the channel member 10 and serves as a guide roller. Mounted on the horizontally extending T-member 38 are two further rollers 46 and 47 which bear on opposite sides of the inwardly facing flange of the stationary T-member 12 (see Figs. 8 and 9). Mounted on the top portion of the door is a guide roller 48 which engages between the channel flanges of the top section of the frame section 10. To enable the door to be locked in a desired opening position, a locking lever 49 provided with a handle is mounted on the door adjacent to the rollers 46 and 47 so as to be rockable about a horizontal pivot pin 50 under the action of a spring 51, said lever being equipped with a locking pin 52 adapted selectively to be engaged into any one of a plurality of holes 53 provided in the inwardly projecting flange of the stationary horizontal T-member 12.

Secured to the lateral frame section 10 beneath the door opening are two steps 54 and 55. Extending horizontally across the inside of the stationary window or windows is a rod 56 which is rubber covered and serves as a handle. A similar rod 57 is provided across the inside of the sliding door 14. The last-mentioned rod, however, is pivotally connected to the door at its front end and is detachably connected to the door at its rear end in such a manner as—when the door is completely open—to be capable of being swung upwardly and forwardly across the door opening and be fastened to the lateral cabin body frame section 10 so as to protect the operator against falling out through the opening.

In the embodiment illustrated in the accompanying drawings it is only the left-hand side of the protective cabin which is provided with a sliding door while two stationary windows, a front and a rear one, are provided on the right-hand side of the protective cabin. It is understood, however, that the last-mentioned cabin side, as well, could be equipped with a sliding door, if desired.

The space available below the roof 19 projecting rearwardly beyond the back of the tractor proper, is utilized according to the invention for accommodating a passenger seat. This seat, in the embodiment illustrated, consists of two rectangular frames 60 and 61 made of tubing and foldably interconnected by hinges 62. Mounted in these frames are webs of wire netting 63 and 64, respectively. The upper or back-rest frame 60 is by means of two links 65 suspended from two loops 66 welded to the outwardly facing surface of the rear cross-member 20. The lower or seat frame 61 is formed with downward extensions 67 by which it can be engaged into fixed retaining hooks 68 provided on the body frame sections 10 so as to cause the seat frame to occupy the horizontal position of use as shown in Fig. 1. A resilient suspension of the passenger seat could be provided for by the use of elastically yielding links 65. This can be accomplished by forming the links of lengths of a powerful rubber belt, in which case, in order to reduce the elastic lengthening of the rubber belt portions, a somewhat longer length of a non-yielding powerful belt, such as of balata, can be disposed outside the rubber belt portions, respectively.

When the passenger seat is not required to be used the seat frame 61 can be folded flat onto the back frame 60, after which the frame members thus collapsed can be swung up beneath the roof and be pushed onto a shelf or may be locked in the position thus attained in any suitable other way. For this purpose, in the embodiment illustrated in Fig. 3, there is provided a rearwardly opening pocket-forming shelf which is formed by a sheet-metal member 69 welded in between the side-frames 10 and being of suitable cross-sectional curvature, this plate member serving at the same time as a cross-member of the body frame to increase the rigidity of the latter. The cross-sectional curvature of the plate member 69 should preferably be smooth so as to be devoid of any sharp edges which might injure the operator.

As an alternative, the passenger seat 60, 61 could be collapsed and be stowed away on the roof. A further possibility would be to store the same as shown in the bottom portion of Fig. 3, i.e. extended and swung into an inboard position so as to cover the back opening of the protective cabin. It is suitable to construct the passenger seat sufficiently powerful to form an efficient protection for the tractor operator against objects tending to penetrate into the cabin from behind. The seat portion 61 might be folded flat onto the back portion 60 while the latter is maintained in its protective position, to thereby facilitate the operation of implements connected to the tractor.

In the modified form of passenger seat illustrated in Figs. 16 to 19, the back frame 60 is mounted with lateral end extensions of its tubular top member in bearing sleeves 80 secured to the read upstanding members of the cabin body frame. The hinges 62 suspending the seat frame 61 from the back frame 60 are designed so as to be resilient to a certain extent. As illustrated in Fig. 19, they simply consist each of a length of balata belt, 81, which is looped about the two adjacent tubular frame members and is joined together at its ends by a bolt 82 adapted at the same time to squeeze the two loop sides together between the tubes. The tubular front or bottom member of the seat frame 61 is open-ended and is aligned, when the seat frame is in its position of use as indicated in full lines in Fig. 16, with two corresponding sleeves 83 secured to the cabin body frame. When in its position of use, the seat frame is locked in position by means of a locking rod 84 passed through the sleeves 83 and the said seat frame tube. This locking rod is provided at one end with a handle 85 formed near its extreme end with a hole which is engaged by a locking bolt 86 secured to the cabin body frame when the locking rod is in its locking position. A hole made in the locking bolt 86 can receive outside the handle 85 a cotter, not shown, adapted to retain the locking rod in its locking position.

At a higher level there are secured to the cabin body frame a pair of sleeves 87 which are in alignment with the open ends of the hinged tubular member of the seat frame 61 when the latter is folded flat against the back frame and the latter is swung forward into the position shown in broken lines in Fig. 16 and in which it covers the back opening of the protective cabin. In this position the seat back is retained by passing the locking rod 84 through the sleeves 87 and the aligned seat frame tube. To secure the latter in its locked position a locking bolt 88 similar to the locking bolt 86 is provided.

As an alternative, the passenger seat is capable of being swung upwards into the position illustrated in broken lines in Fig. 16, in which position the back opening of the protective cabin is completely uncovered. In this position the passenger seat is retained by the locking rod 84 passed, at one end, into a bottomed sleeve 89 secured to the back frame 60 and, at the other end, into a sleeve 90 secured to the body frame, see Fig. 18. The last-mentioned sleeve has lodged therein a compression coil spring 91 which urges a pressure washer 92 against the lower end of the rod 84 so as to maintain the rod in engagement with the sleeve 89.

To protect the passenger against weather and wind there is provided a tarpaulin 70 which extends from behind the operator's seat and is permanently attached at its upper edge to the cabin roof 19. The tarpaulin 70 would normally be disposed inside the passenger seat, as illustrated in Fig. 1, and is fastened along its sides and lower edge to the lateral body frame sections 10 and to the floor, respectively. When not in use, the tarpaulin may be rolled up and fastened to the cabin roof, for instance be placed on the collapsed seat when stowed away and fastened to the roof, as indicated in Fig. 3. Alternatively, the tarpaulin could be passed through the space between the cross-member 20 and the upper portion of the seat back frame 60 and be utilized as a closure member for the back opening of the protective cabin.

For closing up the front of the protective cabin, below the windshield 25, 26, there is attached to the front bottom cross-member 27 a sheet 71 of pegamoid or the like which is extended downward on either sides of the engine compartment 72 and then rearward on the floor of the tractor until it encounters the tarpaulin 70 covering the back opening of the protective cabin. The portion of the pegamoid sheet 71 supported on the floor adjacent the foot controls is covered by a wear-resistant rubber mat 73. The pegamoid sheet 71 can be rolled up on either sides of the engine compartment and may then be fastened beneath the windshield by means of straps, not shown, either in front or in rear of the cross-member 27, whereby in hot weather to allow an unobstructed admission of fresh air into the cabin from both sides of the engine compartment.

The above-described method of wind-screening the bottom portion of the tractor cabin is applicable also in cases where the tractor cannot be constructed with a flat floor.

What is claimed is:

1. In a cabin for a tractor having a dirigible mobile frame mounting an engine over the fore end portion thereof, a rear axle structure mounting widely spaced rear traction wheels, and a driver's seat over said rear axle structure, a rigid frame adapted to be mounted over said rear axle structure including a pair of upright laterally spaced opposite side sections each disposed between one of said rear wheels and the proximate side of said engine, the rear end portions of said frame sections being adapted to extend rearwardly beyond said rear wheels a substantial distance sufficient for engaging the ground should the tractor accidentally turn upwardly and rearwardly, thereby to check said turning movement and to maintain the tractor upright, and a rigid horizontally extending cross member having opposite end portions rigidly secured respectively to said frame sections and disposed at the top of said frame a substantial distance to the rear of said driver's seat, and a passenger seat disposed to the rear of said driver's seat including a back rest section suspended from said cross member, and a seat section supported from said back rest section, said back rest and seat sections being disposed between said frame sections thereby conjointly to close the back of said cabin frame.

2. In a cabin for a tractor as defined in claim 1 wherein the seat section of the passenger seat is foldable against the back rest section of the passenger seat and the folded up passenger seat may be swung about the cross member to an out-of-the-way storage position next to the roof of the cabin, and wherein means are provided for releasably securing said folded up passenger seat in the stored position thereof.

3. In a cabin for a tractor as defined in claim 1 wherein the back rest section is pivotally suspended from said cross member by shock absorbing resilient means.

4. In a cabin for a tractor as defined in claim 1 wherein the back rest section is pivotally suspended from said cross member and the seat section is pivotally connected to said back rest section by shock absorbing resilient means.

5. In a cabin for a tractor as defined in claim 1 wherein the seat section of the passenger seat is foldable against the back rest section of the passenger seat and the folded up passenger seat may be swung about the cross member, and wherein means are provided for releasably securing said folded up passenger seat selectively in a plurality of different positions including means on said frame and passenger seat adapted for being interlocked, and a locking rod selectively interlocking said means thereby to secure said passenger seat in a selected position thereof.

6. In a cabin for a tractor having a dirigible mobile frame mounting an engine over the fore end portion thereof and a rear axle structure mounting widely spaced rear traction wheels, a rigid frame adapted to be mounted over said rear axle structure including a pair of upright laterally spaced opposite side sections each disposed between one of said rear wheels and the proximate side of side engine, one of said side frame sections including a peripherally extending member channel-shaped in transverse section, the flanges of the latter being turned inwardly from the outer periphery of the frame, an upright member dividing said one frame section into open front and rear end areas, and a horizontally extending member dividing said rear end area into open top and bottom areas, a door closing said open front end area and laterally offset inwardly relative to said dividing members, said door being mounted for planar sliding movement fore and aft between closed and opened positions, said door, when in opened position, being disposed within the cabin, on the inner side of the rear end portion of said one frame section, the means for mounting said door providing a three-point support therefor including rollers respectively at the upper and lower fore corners and at the aft end of said door, the rollers at the upper and lower fore corners of the door being engaged with the flanges of said channel member, and the rollers at the aft end of the door being engaged with said horizontally extending dividing member.

References Cited in the file of this patent

UNITED STATES PATENTS

| | | |
|---|---|---|
| 1,372,396 | Blackburn | Mar. 22, 1921 |
| 1,589,543 | Moyses | June 22, 1926 |
| 1,595,298 | Haberer | Aug. 10, 1926 |
| 1,650,757 | Kraus | Nov. 29, 1927 |
| 2,014,140 | Larsen | Sept. 10, 1935 |
| 2,532,948 | Sanden | Dec. 5, 1950 |
| 2,592,879 | Eyerly | Apr. 15, 1952 |
| 2,785,002 | Schumaker | Mar. 12, 1957 |

FOREIGN PATENTS

| | | |
|---|---|---|
| 637,275 | Great Britain | May 17, 1950 |